United States Patent [19]

Catte et al.

[11] Patent Number: 5,096,377
[45] Date of Patent: Mar. 17, 1992

[54] TURBOSHAFT ENGINE CASING JOINT WITH REINFORCED AXIAL RESTRAINT

[75] Inventors: Philippe P. Catte, Chennevieres; Jacky Naudet, Evry, both of France

[73] Assignee: Societe Nationale D'Etude et de Construction de Moteurs D'Aviation "S.N.E.C.M.A.", Paris, France

[21] Appl. No.: 626,551

[22] Filed: Dec. 12, 1990

[30] Foreign Application Priority Data

Dec. 13, 1989 [FR] France ............... 89.16451

[51] Int. Cl.⁵ .................................. F01D 25/28
[52] U.S. Cl. ............................. 415/182.1; 415/9; 415/214.1; 60/39.091; 285/117; 285/363; 403/337; 403/381
[58] Field of Search ........... 415/9, 182.1, 214.1, 415/220; 60/39.091, 223; 285/117, 363, 405; 403/11, 335, 337, 375, 381

[56] References Cited

U.S. PATENT DOCUMENTS

| | | | |
|---|---|---|---|
| 1,389,542 | 8/1921 | Wereley | 285/363 |
| 2,169,092 | 8/1939 | Doran | 415/214.1 |
| 3,544,232 | 12/1970 | Zerlauth | 415/214.1 |

FOREIGN PATENT DOCUMENTS

| | | | |
|---|---|---|---|
| 0670212 | 9/1963 | Canada | 285/363 |
| 273204 | 5/1951 | Switzerland . | |
| 0237495 | 2/1969 | U.S.S.R. | 285/363 |
| 0966450 | 8/1964 | United Kingdom | 285/363 |
| 2068270 | 8/1981 | United Kingdom . | |

*Primary Examiner*—Edward K. Look
*Assistant Examiner*—Christopher M. Verdier
*Attorney, Agent, or Firm*—Oblon, Spivak, McClelland, Maier & Neustadt

[57] ABSTRACT

The casing of a turboshaft engine, particularly a turbojet engine with a high speed propeller, comprises axially successive shells which are fixed firmly to each other end to end by bolted coupling flanges, at least one of the shells comprising an additional mechanical axial retaining joint enabling the connection between the shells to withstand any exceptional stresses such as those caused by the loss of a propeller blade of the turbojet engine. Preferably the retaining joint comprises a radially inwardly directed tongue carried by one of the shells and received in a radially outwardly open groove provided in a portion of the other shell or a member securely fixed thereto.

6 Claims, 2 Drawing Sheets

TURBOSHAFT ENGINE CASING JOINT WITH REINFORCED AXIAL RESTRAINT

BACKGROUND OF THE INVENTION

1. Field of the invention

The present invention relates to the casings of turboshaft engines for aircraft, and in particular to the joining means between the individual shells forming the casing.

2. Summary of the prior art

In general, turboshaft engine casings are formed by shells, either circular or semi-circular, which are joined together by means of radially outwardly directed coupling flanges on the shells, the faces of the flanges in contact with one another being provided with evenly spaced holes for the passage of fixing screws or bolts. The thickness of the flanges and the diameter of the screws or bolts are determined with regard to the axial stresses to which the casing is subjected and in accordance with precise standards established for each type of engine.

New types of turboshaft engines have recently appeared, such as turbojet engines with high speed propellers comprising a gas generator driving free counter-rotating turbines which themselves drive counter-rotating propellers of either the pusher or tractor type.

The standards for calculating the strength of the casings of such engines must take into account all eventualities that might be encountered so as to ensure that they are sufficiently robust to counter any risk of accidental destruction of the engine. One of the events with a low probability rating, but which must not be overlooked is the loss or breakage of the propeller blades. Such an exceptional breakage could be caused, for example, by the entry into the propeller doublet of an object emanating from the aircraft (door, piece of tire tread, etc.), either during take off or during flight.

In such a case, the breakage of the propeller blades would impose on the coupling flanges of the casing shells stresses of the order of 50 tonnes. If the thickness of the flanges and the diameters of the fixing bolts have to be of a size to withstand such stresses, this would involve a considerable increase in the weight and radial bulk of the engine, which is incompatible with the traditionally severe requirements for turbojet engines of low overall size and lightness.

It is therefore an object of the present invention to provide a new configuration for casing flanges which enables them to withstand exceptionally large axial loads without increasing the weight or overall size of the engine.

SUMMARY OF THE INVENTION

According to the invention, there is provided a turboshaft engine casing including axially successive shells, coupling flanges on said shells, and screw-threaded means connecting said coupling flanges to fix said shells firmly to each other end to end, at least one of said shells comprising additional mechanical axial retaining means enabling the connection between said shells to withstand any exceptional mechanical stresses such as those caused by the loss of a propeller of the engine.

Preferably the axial retaining means comprises a radially inwardly directed tongue carried by the coupling flange of one of the shells, and a radially outwardly open groove which receives said tongue therein, the groove being formed either in a portion of the other shell itself or in a member which is secured firmly to the other shell.

In the latter case, preferably there is a radially inwardly directed tongue carried by said coupling flange of each of said shells, and said member comprises an intermediate flange sandwiched between said coupling flanges, said member being provided with two radially outwardly open grooves, one of said grooves receiving said tongue on one of said shells, and said other groove receiving said tongue on said other shell.

Other preferred features of the invention will become apparent from the following description of various embodiments with reference to the drawings.

DESCRIPTION OF THE PREFERRED EMBODIMENTS

Figure 1:
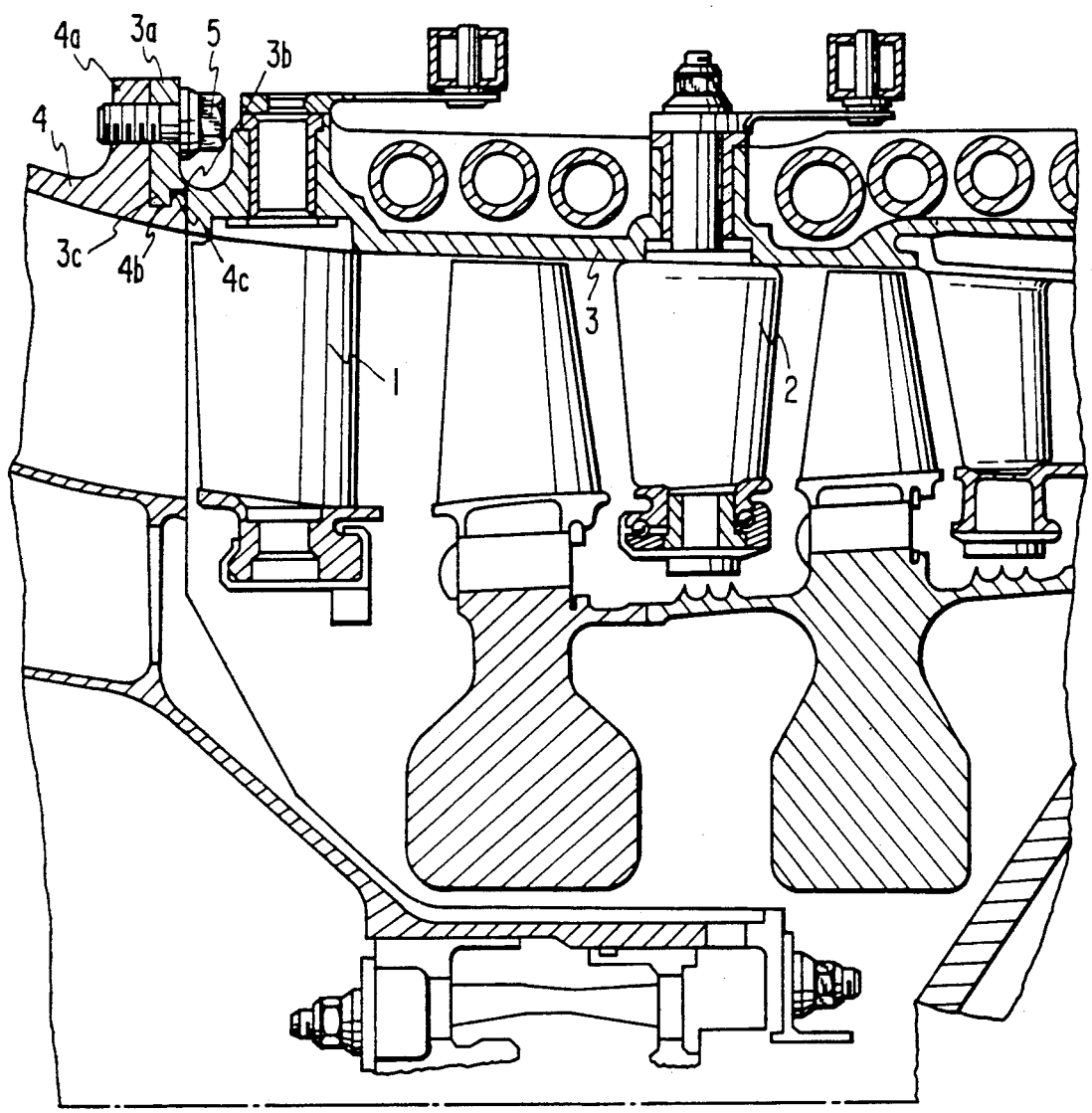
FIG. 1 is a longitudinal section of part of a compressor of a turboshaft engine in which the casing is fitted with one embodiment of the retaining means in accordance with the invention at the upstream end of the compressor casing.

FIG. 1 illustrates the high pressure compressor of a turboshaft engine of which the first two stator stages 1,2 have adjustable pitch and are placed within a compressor casing. This casing is formed by two semicircular shells 3 fixed at their upstream end to the casing 4 of a low pressure compressor or to an intermediate casing.

The shells 3 are attached to the casing 4 by means of flanges 3a which extend radially outwards at the upstream end of the shells and which are fixed by bolts 5 to a circular flange 4a at the downstream end of the casing 4.

Downstream of the flange 4a at its radially inner edge, the casing 4 comprises a portion having a circular groove 4b which is open radially outwards and is terminated on the downstream side by a circular shoulder 4c.

Each shell 3 of the high pressure compressor comprises, substantially in line with its upstream flange 3a, a tongue 3c which is directed radially inwards and is followed downstream by an inwardly open semi-circular groove 3b.

During assembly, when each semi-circular shell 3 of the high pressure compressor casing is positioned against the casing 4, the tongue 3c fits into the groove 4b, and the groove 3b receives the shoulder 4c, thus forming mutual axial retaining means for the elements of the casings 3 and 4 when they are subjected to exceptional stresses.

Figure 2:
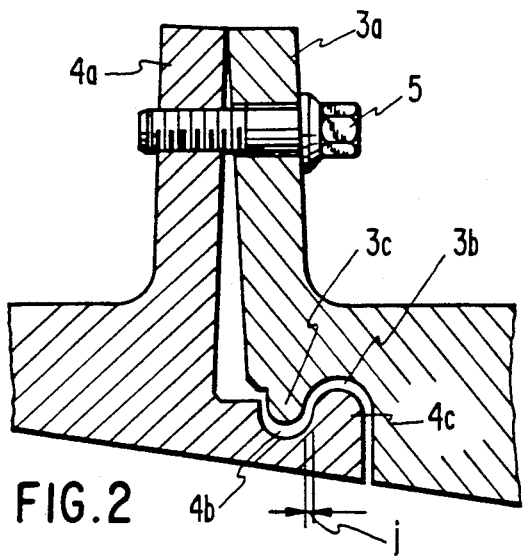
FIG. 2 is a sectional diagram of the connection between the casing shells of the first embodiment under normal operational stresses.
Figure 3:
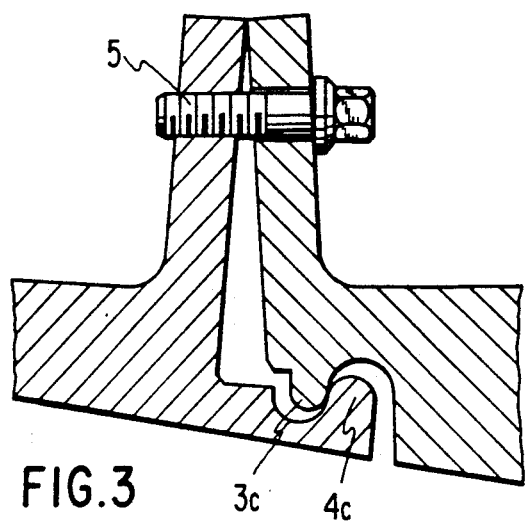
FIG. 3 is a similar diagram to that of FIG. 2, but showing the connection under operational stresses of an exceptional nature.

On looking at FIGS. 2 and 3 it may be seen that the tongue 3c is of lesser thickness than the width of the groove 4b which receives it. Thus, an axial clearance "j" exists between the tongue and the groove so that, when the casing is subjected to normal stresses, the downstream edge of the tongue 3c does not come into contact with the edge of the shoulder 4c, as shown in FIG. 2. Axial stresses are then taken only by the bolts 5.

On the other hand, as shown in FIG. 3, when the assembly is subjected to exceptional stresses of the type created by the loss of a propeller, the tongue 3c comes to bear against the shoulder 4c and provides axial restraint to supplement the hold provided by the bolts 5, this hook-like coupling taking the major part of the stresses to which the assembly is subjected.

Figure 4:
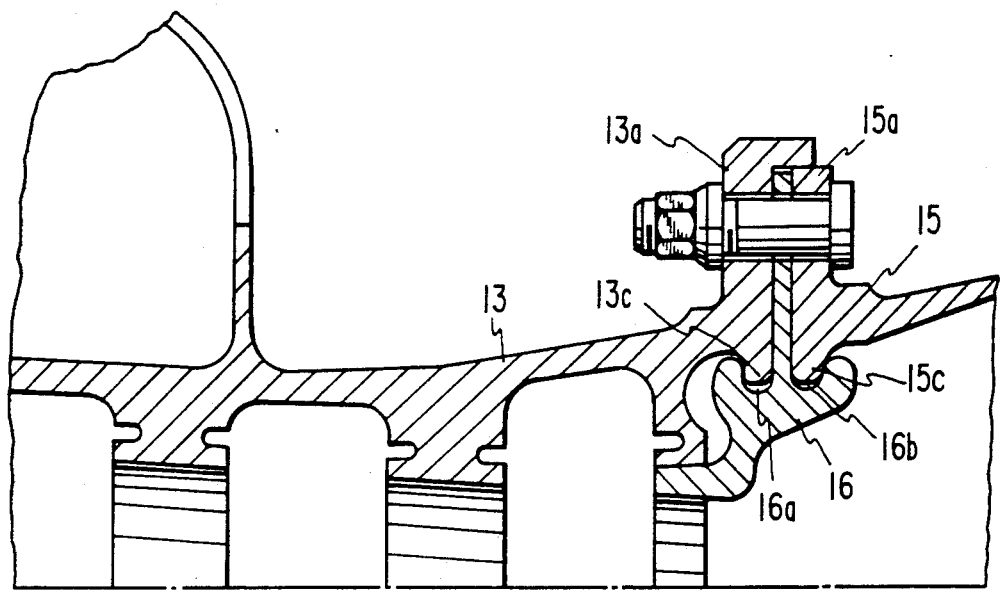
FIG. 4 is a partial sectional view showing another embodiment of the connection between two shells of a casing in accordance with the invention.

FIG. 4 shows an embodiment of the invention applied to the joint between a high pressure compressor casing 13 and the casing of a combustion chamber 15.

In this embodiment, a member 16 is utilized having an intermediate flange interposed and fixed between the downstream flange 13a of the compressor casing and the upstream flange 15a of the combustion chamber casing. The casings 13 and 15 each comprise a radially inwardly facing tongue 13c,15c, whilst the member 16 is provided with two annular grooves 16a,16b each receiving one of the circular tongues 13c and 15c respectively, the assembly thus ensuring axial restraint for the coupling between the casings.

Figure 5:
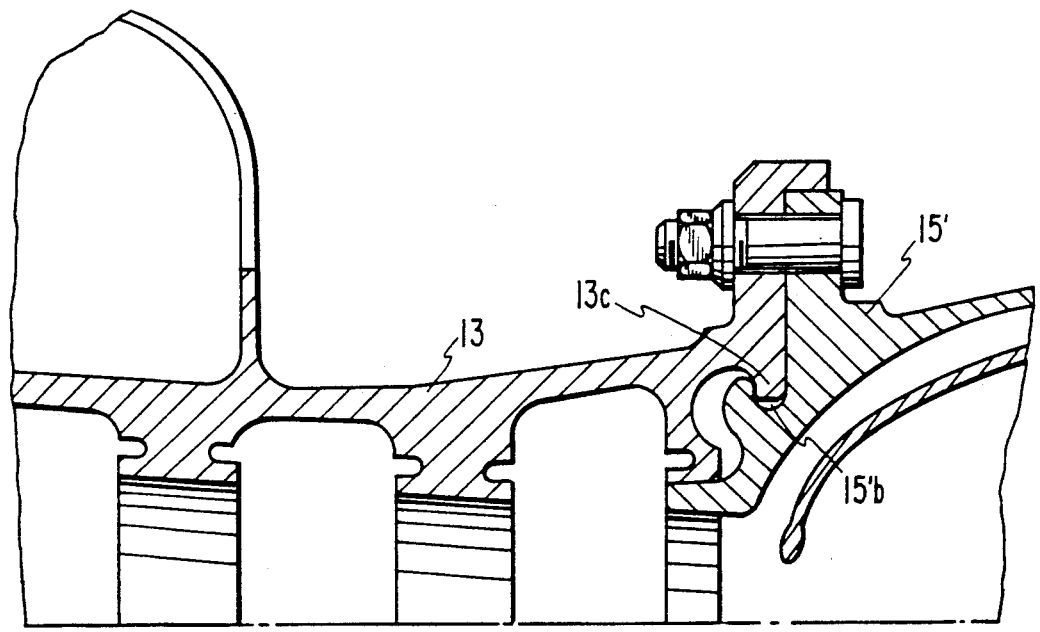
FIG. 5 is a partial sectional view showing a variant of the embodiment of FIG. 1, applied to the connection between the downstream end of the compressor casing and the casing of the combustion chamber.

In the variant of FIG. 5, which is also applied to the joint between a high pressure compressor casing 13 and a combustion chamber casing 15', the downstream end of the casing 13 is formed in the same way as in FIG. 4, but the combustion chamber casing 15' is different, having at its upstream end a circular groove 15'b for receiving the tongue 13c of the high pressure casing. This of course avoids the use of a separate additional member.

The three embodiments shown in FIGS. 1,4 and 5 are usable when the compressor casing is formed by two semicircular shells.

When a one-piece circular shell is used, it is necessary that the tongues and grooves each comprise cut-out sections at circumferentially spaced intervals so as to allow each tongue to be fitted in the corresponding groove by relative axial movement of said shells to move said tongue into the cut-out sections of said groove followed by relative rotation of said shells to move said tongue into said groove before said coupling flanges are connected together.

Figure 6:
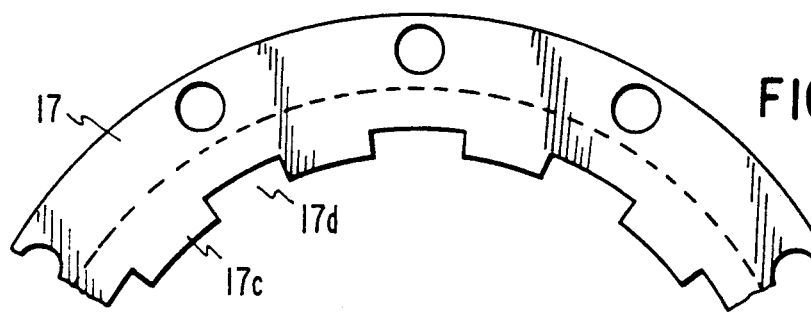
FIG. 6 is a partial axial end view of the coupling flange of a circular casing shell carrying a radially inwardly directed tongue having circumferentially spaced cut-out regions to allow the engagement of the flange with the corresponding flange of the adjacent casing shell.

This is illustrated diagrammatically in FIG. 6, which shows an end view of a coupling flange 17 having an inner tongue 17c with circumferentially spaced cut-outs 17d which allow the engagement and coupling of a second shell, not shown.

The invention thus permits the technical problem mentioned earlier to be solved without over-sizing the flanges or the fixing bolts and therefore without a prohibitive increase in weight.

We claim:

1. A turboshaft engine casing including axially successive shells, coupling flanges on said shells, and screw-threaded means connecting said coupling flanges to fix said shells firmly to each other end to end, at least one of said shells comprising additional mechanical axial retaining means enabling the connection between said shells to withstand any exceptional mechanical stresses such as those caused by the loss of a propeller of the engine.

2. A casing in accordance with claim 1, wherein said axial retaining means comprises a radially inwardly directed tongue carried by said coupling flange of one of said shells, and a portion of said other shell provided with a radially outwardly open groove which receives said tongue therein.

3. A casing in accordance with claim 1, wherein said axial retaining means comprises a radially inwardly directed tongue carried by said coupling flange of one of said shells, and a member which is secured firmly to said other shell, said member being provided with a radially outwardly open groove which receives said tongue therein.

4. A casing in accordance with claim 3, wherein there is a radially inwardly directed tongue carried by said coupling flange of each of said shells, and said member comprises an intermediate flange sandwiched between said coupling flanges, said member being provided with two radially outwardly open grooves, one of said grooves receiving said tongue on one of said shells, and said other groove receiving said tongue on said other shell.

5. A casing in accordance with claim 1, wherein said shells are semi-circular shells.

6. A casing in accordance with claim 2 or claim 3, wherein said shells are circular, and said groove and said tongue each comprise cut-out sections at circumferentially spaced intervals so as to permit said tongue to be fitted into said groove by relative axial movement of said shells to move said tongue into the cut-out sections of said groove followed by relative rotation of said shells to move said tongue into said groove before said coupling flanges are connected together.

* * * * *